(12) United States Patent
Stancu et al.

(10) Patent No.: US 7,372,712 B2
(45) Date of Patent: May 13, 2008

(54) MULTIPLE INVERTER SYSTEM WITH SINGLE CONTROLLER AND RELATED OPERATING METHOD

(75) Inventors: Constantin C. Stancu, Anaheim, CA (US); Mark L Selogie, Manhattan Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/756,398

(22) Filed: May 31, 2007

(65) Prior Publication Data

US 2007/0223262 A1 Sep. 27, 2007

Related U.S. Application Data

(63) Continuation of application No. 11/233,840, filed on Sep. 23, 2005, now Pat. No. 7,277,304.

(51) Int. Cl.
*H02M 3/537* (2006.01)

(52) U.S. Cl. .................................................. 363/71

(58) Field of Classification Search ................. 363/65, 363/71, 95, 131, 56.01
See application file for complete search history.

(56) References Cited

U.S. PATENT DOCUMENTS

| 6,388,904 | B2 | 5/2002 | Nomura |
| 6,486,632 | B2 | 11/2002 | Okushima et al. |
| 6,778,415 | B2 | 8/2004 | Lin |
| 6,864,646 | B2 | 3/2005 | Rahman et al. |
| 6,867,987 | B2 | 3/2005 | Cheng et al. |
| 7,277,304 | B2 * | 10/2007 | Stancu et al. ................. 363/71 |

* cited by examiner

*Primary Examiner*—Adolf Berhane

(57) ABSTRACT

Methods for controlling a multiple DC-to-AC inverter system, which is suitable for an electric or hybrid vehicle application, are disclosed. In one embodiment, if an inverter fails or suffers from degraded performance (faulty inverter), the faulty inverter is disabled and drive signals to a healthy inverter that is coupled to the faulty inverter are updated such that the healthy inverter can remain active without being driven into an over-current condition.

13 Claims, 3 Drawing Sheets

MULTIPLE INVERTER SYSTEM WITH SINGLE CONTROLLER AND RELATED OPERATING METHOD

CROSS-REFERENCE TO RELATED APPLICATION

This application is a continuation of U.S. patent application Ser. No. 11/233,840, filed Sep. 23, 2005, now U.S. Pat. No. 7,277,304 which is incorporated herein in its entireties by reference.

TECHNICAL FIELD

The present invention generally relates to electrical machinery, and more particularly relates to a DC-to-AC inverter system suitable for use with a traction system in an electric or hybrid vehicle.

BACKGROUND

An inverter is an electrical component that can be configured to convert a DC signal into an AC signal. The prior art is replete with different inverter designs, inverter controller designs, and electromechanical systems that incorporate inverters. For example, an electric (or hybrid) vehicle may employ one or more DC-to-AC inverters as a power source for the motor. Some heavy duty vehicles utilize multiple inverters in a combined arrangement that is capable of powering a high power/torque multiphase AC motor.

Conventional multiple inverter systems utilize separate controllers for each inverter. For example, a four-inverter system typically includes four distinct controllers. The use of additional controllers in this manner results in increased cost, increased weight, and increased physical size requirements, which is undesirable in most practical deployments.

In some multiple inverter systems the outputs of two or more inverters may be connected together for purposes of driving the motor. In conventional systems, if one of the "combined" inverters fails, then the remaining inverters may be overdriven into an undesirable and potentially damaging over-current condition. To address this situation, conventional systems might shut down the remaining inverters, thus protecting them. Unfortunately, the disabling of healthy inverters results in a loss of drive power, which can render some heavy duty vehicles inoperable.

Accordingly, it is desirable to have a multiple DC-to-AC inverter system that can be realized with less physical components, resulting in cost savings, reduced weight, and reduced size. In addition, it is desirable to have a multiple DC-to-AC inverter system having an automatic redundancy and protection feature. Furthermore, other desirable features and characteristics of the present invention will become apparent from the subsequent detailed description and the appended claims, taken in conjunction with the accompanying drawings and the foregoing technical field and background.

BRIEF SUMMARY

An embodiment of a method for controlling a multiple DC-to-AC inverter system begins by generating a fault status for a faulty inverter among a plurality of inverters if the faulty inverter fails or suffers from degraded performance. The method then detects the fault status for the faulty inverter and disables the faulty inverter in response to detection of the fault status to prevent loss of drive power in a vehicle. The method then determines new operating parameters for a non-faulty inverter among the plurality of inverters and generates an updated gate drive signal set for the non-faulty inverter, where the updated gate drive signal set is influenced by the new operating parameters.

Another embodiment of a method for controlling a multiple DC-to-AC inverter system begins by generating a fault status if an inverter among the plurality of inverters fails or suffers from degraded performance, detects the fault status for the faulty inverter, and disables the faulty inverter in response to detection of the fault status to prevent an over-current condition in a healthy inverter. The method then recalculates a current reference for reduced overall performance with the faulty inverter disabled and the healthy inverter enabled, recalculates electrical quantities that depend upon the current reference, and calculates updated load current requirements that account for the disabling of the faulty inverter. The method then generates an updated gate drive signal set for the non-faulty inverter, where the updated gate drive signal set is influenced by the current reference, the electrical quantities, and the updated load current requirement.

An embodiment of a system for controlling a multiple DC-to-AC inverter system includes: means for generating a fault status for a faulty inverter among a plurality of inverters if the faulty inverter fails or suffers from degraded performance; means for disabling a faulty inverter in response to detection of the fault status to prevent loss of drive power in a vehicle; means for determining new operating parameters for a non-faulty inverter among the plurality of inverters; and means for generating an updated gate drive signal set for the non-faulty inverter, where the updated gate drive signal set is influenced by the new operating parameters.

BRIEF DESCRIPTION OF THE DRAWINGS

The present invention will hereinafter be described in conjunction with the following drawing figures, wherein like numerals denote like elements.

DETAILED DESCRIPTION

Figure 1:
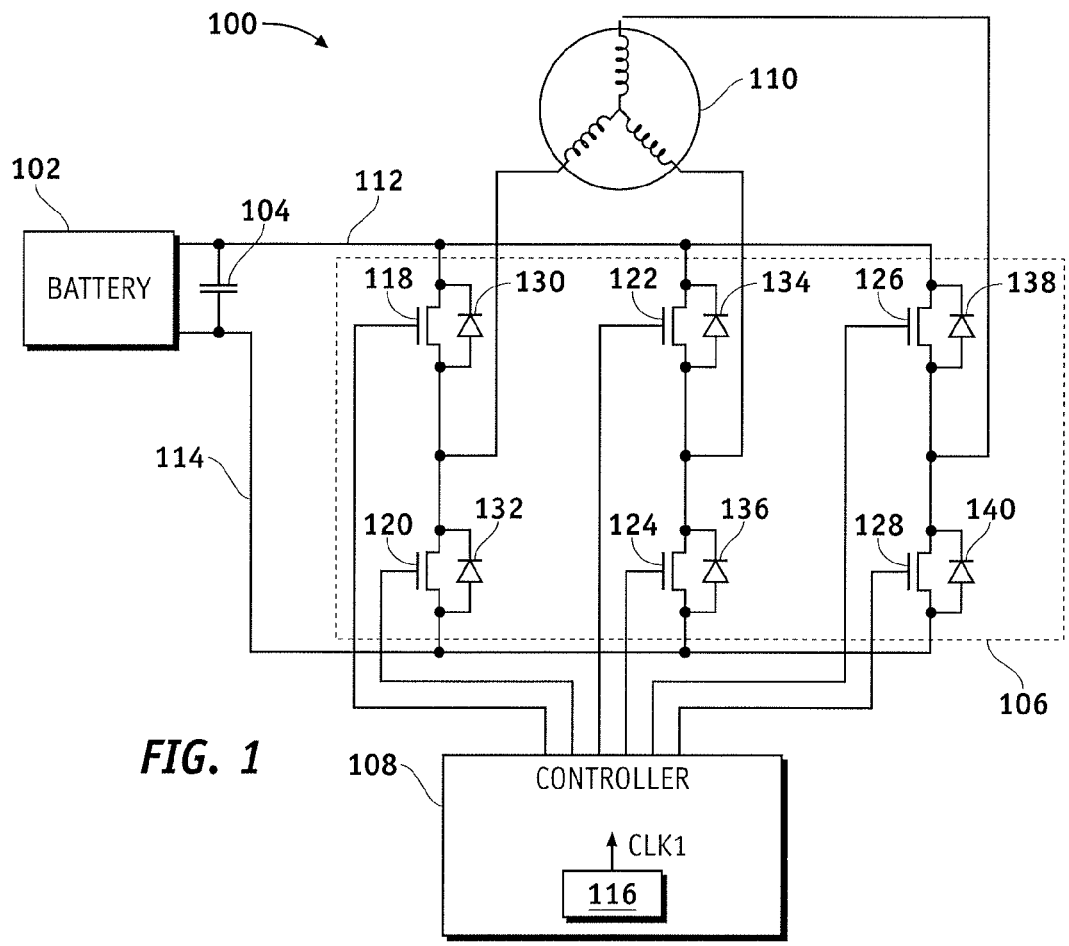
FIG. 1 is a schematic representation of an electrical system suitable for use with an electric or hybrid vehicle.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of practical applications and that the vehicle traction system described herein is merely one exemplary application for the invention.

For the sake of brevity, conventional techniques related to electrical inverters, inverter control and synchronization techniques, AC power generation, electric motors, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "connected" means that one node/feature is directly joined to (or directly communicates with) another node/feature, and not necessarily mechanically. Likewise, unless expressly stated otherwise, "coupled" means that one node/feature is directly or indirectly joined to (or directly or indirectly communicates with) another node/feature, and not necessarily mechanically. Thus, although the figures depict example arrangements of elements, additional intervening elements, devices, features, or components may be present in an actual embodiment (assuming that its functionality is not adversely affected).

FIG. 1 is a schematic representation of an electrical system 100 suitable for use with an electric or hybrid vehicle. Electrical system 100 generally includes a battery 102, a smoothing capacitor 104, an inverter 106, a controller 108, and a motor 110. Battery 102 has a positive terminal coupled to a power bus 112 and a negative terminal coupled to a negative bus 114. Capacitor 104 has a first terminal coupled to power bus 112 and a second terminal coupled to negative bus 114. Capacitor 104 is large enough to smooth power bus ripples that may be generated during operation of a practical system.

Motor 110 is a three-phase AC motor having three terminals connected for respective phases thereof. Controller 108 has six output terminals for providing two inverter drive signals associated with each of the three phases of motor 110. Controller 108 may also include a clock generator circuit 116 that provides a clock signal labeled "CLK1" in FIG. 1. Although not shown in FIG. 1, controller 108 may include or be coupled to a gate drive that is suitably configured to amplify the power of control signals to the level required by inverter 106. Alternatively, inverter 106 may include or be coupled to the gate drive. Controller 108 internally is implemented as a digital microcontroller with a central processing unit, memory, and input/output circuitry.

The input/output circuitry includes pulse width modulation ("PWM") circuitry that generates output waveforms having duty cycles corresponding to the inverter drive signals required for driving the three phases of motor 110 at the appropriate time to cause the rotor of motor 110 to turn at the desired speed or to produce the desired torque.

Inverter 106 includes six solid state semiconductor switches (which may be realized as transistors, as described below) and six diodes. In FIG. 1, the transistors are identified by reference numbers 118, 120, 122, 124, 126, and 128, and the protection diodes are identified by reference numbers 130, 132, 134, 136, 138, and 140. Transistor 118 has a terminal connected to power bus 112, a gate for receiving a first PWM inverter drive signal associated with a first phase of motor 110 from controller 108, and a terminal connected to a first phase winding of motor 110. Transistor 120 has a terminal connected to the terminal of transistor 118, a gate for receiving a second PWM inverter drive signal associated with the first phase of motor 110 from controller 108, and a terminal connected to negative bus 114. Transistor 122 has a terminal connected to power bus 112, a gate for receiving a first PWM inverter drive signal associated with a second phase of motor 110 from controller 108, and a terminal connected to a second phase winding of motor 110. Transistor 124 has a terminal connected to the terminal of transistor 122, a gate for receiving a second PWM inverter drive signal associated with the second phase of motor 110 from controller 108, and a terminal connected to negative bus 114. Transistor 126 has a terminal connected to power bus 112, a gate for receiving a first PWM inverter drive signal associated with a third phase of motor 110 from controller 108, and a terminal connected to a third phase winding of motor 110. Transistor 128 has a terminal connected to the source of transistor 126, a gate for receiving a second PWM inverter drive signal associated with the third phase of motor 110 from controller 108, and a terminal connected to negative bus 114. Each diode has a cathode connected to a first terminal of a respective one of the transistors, and an anode connected to a second terminal of that transistor.

Figure 2:
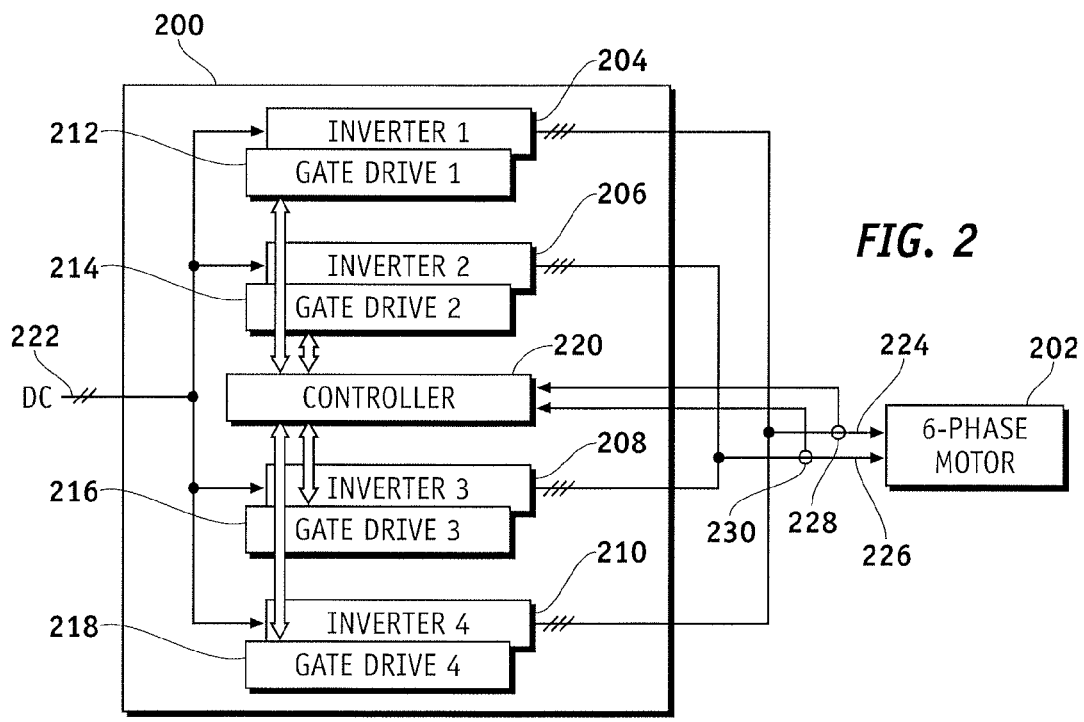
FIG. 2 is a schematic representation of a multiple DC-to-AC inverter system configured in accordance with an example embodiment of the invention.

The basic topology and operation of inverter 106 can be leveraged by a multiple DC-to-AC inverter system configured to drive a vehicle traction system. In this regard, FIG. 2 is a schematic representation of a multiple DC-to-AC inverter system 200 configured in accordance with an example embodiment of the invention. Although inverter system 200 is designed to drive a six-phase motor 202, the invention is not limited to any specific configuration. Indeed, the invention as described herein can be utilized in connection with any system having any number (greater than one) of inverters, each inverter in the system can have any number of phases, and the motor driven by the system can have any number of phases.

Inverter system 200 generally includes a first inverter 204, a second inverter 206, a third inverter 208, a fourth inverter 210, a first gate drive 212 for first inverter 204, a second gate drive 214 for second inverter 206, a third gate drive 216 for third inverter 208, a fourth gate drive 218 for fourth inverter 210, and a controller 220. Each inverter has a respective DC input and a respective AC output, and each inverter is suitably configured to generate, at its AC output, a respective AC output signal in response to a DC input signal applied to its DC input (as described above in connection with inverter 106). In this example, a DC input signal 222 is common to all of the inverters. It should be understood that DC input signal 222 is carried by two leads in practical embodiments.

In this example, first inverter 204 cooperates with fourth inverter 210 to provide a first combined AC output signal 224 for motor 202, and second inverter 206 cooperates with third inverter 208 to provide a second combined AC output signal 226 for motor 202. In this regard, the AC output of first inverter 204 may be coupled to the AC output of fourth inverter 210, and the AC output of second inverter 206 may be coupled to the AC output of third inverter 208 (as depicted in FIG. 2). In FIG. 2, inverter system 200 includes four AC outputs corresponding to the four inverters. In an alternate embodiment, inverter system 200 may include a plurality of "combined" AC outputs, where each combined AC output is configured to provide a combined AC output signal from a respective subset of the inverters. For example, inverter system 200 could employ two combined AC outputs: one for first combined AC output signal 224 and one for second combined AC output signal 226.

In practice, inverter system 200 is powering six-phase motor 202 using two independent sets of three-phase windings. The three-phase motor windings powered by first inverter 204 and fourth inverter 210 are independent from the three-phase motor windings powered by second inverter 206 and third inverter 208. Motor 202 is built with two sets of windings for increased reliability, however, the scope of the invention is not limited by this particular configuration. In order to balance the currents into the two sets of windings, controller 220 measures or detects the currents of two of the three phases of each winding set. Such detection may be achieved with a first current sensor set 228 and a second current sensor set 230, each of which is configured to provide feedback information (which may be a current measurement or any quantity, signal, or data indicative of measured current) back to controller 220 for closed-loop control.

Each gate drive of inverter system 200 has a gate drive input (which may be configured to accommodate any number of different input signals) and a gate drive output (which may be configured to accommodate any number of different output signals). The gate drive input is coupled to controller 220, and is preferably configured to facilitate bi-directional communication with controller 220 as depicted in FIG. 2. The gate drive output is coupled to the respective inverter corresponding to the gate drive. Each gate drive is suitably configured to receive a gate drive signal set from controller 220, and to produce, at its gate drive output, an inverter drive signal set in response to the received gate drive signal set. As used herein, a "signal set" means a group of related or associated signals (e.g., control, drive, sensor, fault status, or other signal) for a single component. For example, controller 220 generates a plurality of gate drive signals for each gate drive, to facilitate proper generation of the three-phase AC output signals. In this context, a plurality of gate drive signals for one gate drive may be included in a gate drive signal set.

Controller 220 includes a plurality of gate drive signal outputs, each coupled to one of the gate drives (more particularly, coupled to the gate drive input of the gate drive). Controller 220 is configured to generate, at its gate drive signal outputs, the plurality of gate drive signal sets for the gate drives. Thus, controller 220 generates and delivers control signals to the four gate drives. The gate drives function to amplify the power of the gate drive signals to levels required by the inverters. In this example, the gate drives also provide to controller 220 information about the status of the individual inverters. Consequently, in a practical embodiment, controller 220 may utilize a plurality of gate drive input/output groups for control signal outputs and gate drive status inputs, where each input/output group corresponds to a respective one of the inverters in inverter system 200. In order to reduce system complexity and cost, the currents of the individual inverters are not measured separately in this embodiment. Rather, the currents are measured by current sensor sets 228/230 after the parallel connection of the inverter pairs.

Under normal operating conditions, controller 220 controls all four inverters. During normal operation, the gate drive signal set for first inverter 204 corresponds to the gate drive signal set for fourth inverter 210, and the gate drive signal set for second inverter 206 corresponds to the gate drive signal set for third inverter 208. In other words, first and fourth inverters 204/210 are driven with identical or equivalent drive signals, while second and third inverters 206/208 are driven with identical or equivalent drive signals (that are independent of the drive signals for first and fourth inverters 204/210). In practice, inverter system 200 leverages the fact that the inverters have very similar operating characteristics and that a pair of inverters will share current once they are coupled in parallel.

If one of the four inverters fails (or is otherwise deemed faulty by inverter system 200) and its protection system shuts it down, the remaining inverter in the parallel combination may become overloaded as a result of an over-current condition. The conventional approach to this problem is to permanently shut down both inverters in the parallel combination. Inverter system 200, however, need not permanently disable both inverters. Rather, controller 220 is suitably configured to detect a fault status for the faulty inverter, determine new operating parameters for the healthy or non-faulty inverter in the parallel combination, and generate an updated gate drive signal set for the healthy inverter. The updated gate drive signal set is influenced by the new operating parameters and is generated to prevent an over-current condition in the non-faulty inverter. Controller 220 may also disable the faulty inverter in response to the fault status (for example, if the fault status indicates a failure for the faulty inverter). In addition, the updated gate drive signal set may include a disabling gate drive signal set that functions to disable the non-faulty inverter. As mentioned above, the fault status may be provided by the gate drive for the faulty inverter.

In the example embodiment shown in FIG. 2, if first inverter 204 fails, controller 220 will update the gate drive signals for fourth inverter 210 while maintaining the original gate drive signals for second and third inverters 206/208. If second inverter 206 fails, controller 220 will update the gate drive signals for third inverter 208 while maintaining the original gate drive signals for first and fourth inverters 204/210. If third inverter 208 fails, controller 220 will update the gate drive signals for second inverter 206 while maintaining the original gate drive signals for first and fourth inverters 204/210. If fourth inverter 210 fails, controller 220 will update the gate drive signals for first inverter 204 while maintaining the original gate drive signals for second and third inverters 206/208.

The updated gate drive signals allow inverter system 200 to operate at a lower output power level without having to disable the non-faulty inverters that are combined with the faulty inverter. If both inverters of a parallel combination fail, then motor 202 will be powered by the remaining set of two parallel inverters, at a further reduced performance level. An over-current condition is not an issue in this situation because each of the independent groups of inverters has a separate set of gate drive signals and a separate current feedback measurement component.

Figure 3:
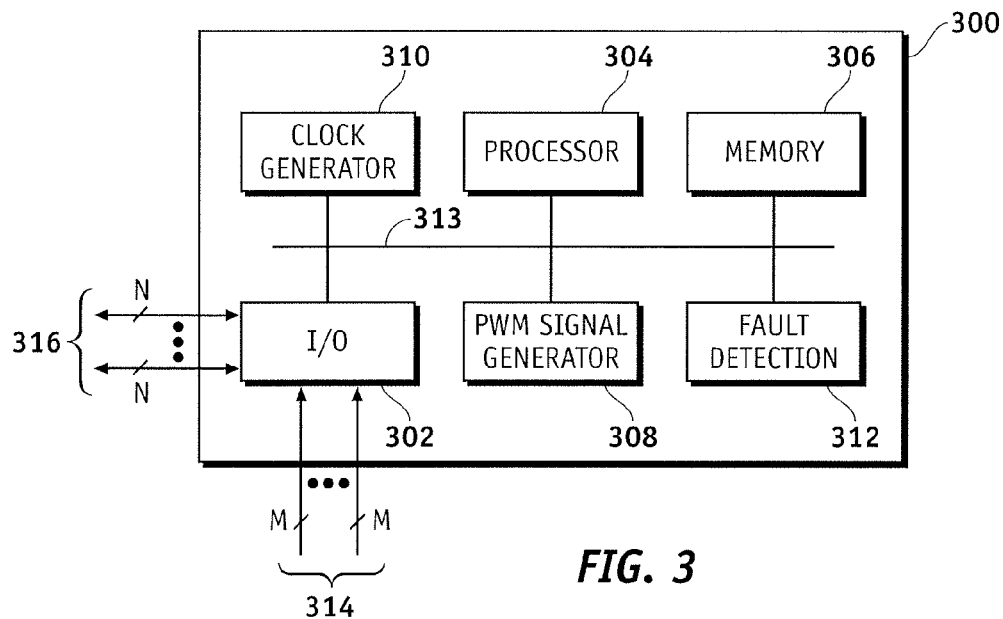
FIG. 3 is a schematic representation of a controller suitable for use in the inverter system shown in FIG. 2.

FIG. 3 is a schematic representation of a controller 300 suitable for use with inverter system 200. Controller 300 has been simplified for purposes of this description; a practical controller 300 will include additional features, elements, and functionality related to conventional operating aspects that need not be described herein.

Controller 300 generally includes input/output logic 302, a processor 304, memory 306, a signal generator 308, a clock generator 310, and fault detection logic 312. Controller 300 may employ a bus 313 that facilitates communication between these components as necessary. Input/output logic 302 is configured to receive current sensor measurement information 314 from any number (M) of current sensor sets, and to generate any number (N) of gate drive signal sets for a like number of gate drives to which controller is coupled. These signals may be associated with input/output groups 316 of controller 300. Input/output groups 316 may also support the communication of fault status information from the gate drives to controller 300.

Processor 304 may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. Processor 304 is generally configured to perform the tasks and functions that support the operation of controller 300 as described herein. In this regard, the steps of a method or algorithm described in connection with the embodiments disclosed herein may be embodied directly in hardware, in firmware, in a software module executed by a processor, or in any practical combination thereof. A software module may reside in memory 306, which may be realized as RAM memory, flash memory, ROM memory, EPROM memory, EEPROM memory, registers, a hard disk, a removable disk, a CD-ROM, or any other form of storage medium known in the art. In practice, memory 306 can be coupled to processor 304 such that processor 304 can read information from, and write information to, memory 306. In the alternative, memory 306 may be integral to processor 304. As an example, processor 304 and memory 306 may reside in an ASIC.

Signal generator 308, which is preferably configured as a PWM signal generator, cooperates with clock generator 310 in the manner described above to generate the gate drive signal sets for driving a plurality of gate drives corresponding to a plurality of inverters. Signal generator 308 may leverage known PWM techniques to generate the gate drive signal sets, and such known techniques will not be described in detail herein.

Fault detection logic 312 is suitably configured to process fault status information received by controller 300, where such fault status information is generated by the gate drives to which controller 300 is coupled. During normal operation, the fault status information will indicate a healthy status for all inverters. If an inverter fails or suffers from degraded performance, then its corresponding gate drive can generate a suitable fault status indicator that informs controller 300 of the current state of the faulty inverter. Fault detection logic 312 (and/or processor 304) may process the fault status indicators to determine how best to proceed. For example, fault detection logic 312 may prompt the generation of new operating parameters for the remaining non-faulty inverters.

Figure 4:
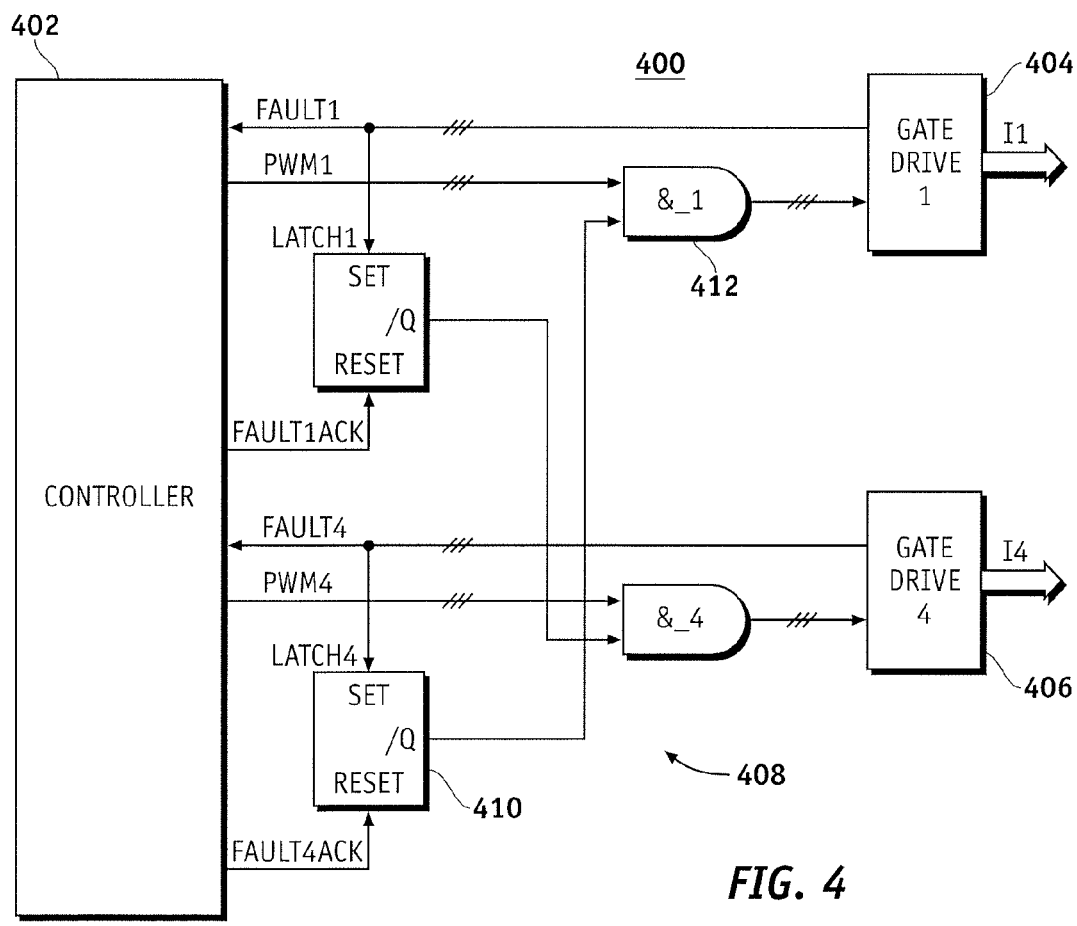
FIG. 4 is a schematic representation of a portion of a multiple DC-to-AC inverter system configured in accordance with an example embodiment of the invention.

A practical inverter system that employs the techniques described herein may utilize the example hardware implementation depicted in FIG. 4. FIG. 4 is a schematic representation of a portion of a multiple DC-to-AC inverter system 400 configured in accordance with an example embodiment of the invention. Inverter system 400 generally includes a controller 402, a first gate drive 404 for coupling to a first inverter (not shown), a fourth gate drive 406 for coupling to a fourth inverter (not shown), and logical elements 408 coupled between controller 402 and gate drives 404/406. For simplicity, FIG. 4 does not show the equivalent structure for a second gate drive and a third gate drive. In a practical embodiment, logical elements 408 may be considered to be a part of controller 402, i.e., logical elements 408 may be realized on the same circuit card as controller 402.

In the example implementation depicted in FIG. 4, the PWM signals to the parallel-coupled inverters are gated with a signal generated at the output of respective latches. In FIG. 4, if latch 410 is set (Set="1"), its output is "0" which implies that the set of gates 412 are disabled and none of the PWM1 signals will reach first gate drive 404. If latch 410 is reset (Reset="1"), its output is "1" and the PWM1 signals will control first gate drive 404. As depicted in FIG. 4, latch 410 is set if fourth gate drive 406 provides fault information to controller 402, e.g., fourth inverter 406 has faulted and has shut down. Following such a condition, first inverter 404 is rapidly shut down via latch 410 and gates 412, so an over-current situation can be prevented. Once controller 402 takes appropriate action to reduce performance demand, it will issue the signal Fault4ACK="1" and latch 410 will be reset, allowing the healthy first inverter 404 to resume operation.

The hardware implementation of FIG. 4 is desirable in practical deployments where controller 402 operates on a discrete time basis, called acquisition cycle, and checks the status of the fault input lines every 50 to 100 microseconds, or possibly even slower. In this time interval, before controller 402 detects a fault, the current in the healthy inverter can reach unacceptable values and eventually fault out. The use of faster, more advanced processors that could be interrupt-driven by the fault input lines could eliminate the need for the hardware logic part shown in FIG. 4.

The operation of the redundancy handling system will be similar if first inverter 404 fails and fourth inverter 406 is healthy. The same applies for the parallel-coupled second and third inverters. By applying the techniques described herein, each time an inverter component of the quad-inverter fails, the motor continues to operate with 75% of the capability, rather than 50% capability as in conventional systems. The concept is also applicable to dual inverters in parallel, driving 3-phase motors. If one inverter fails, instead of losing the entire system, 50% of the output capability can be quickly re-established after a very short shut-down period.

Figure 5:
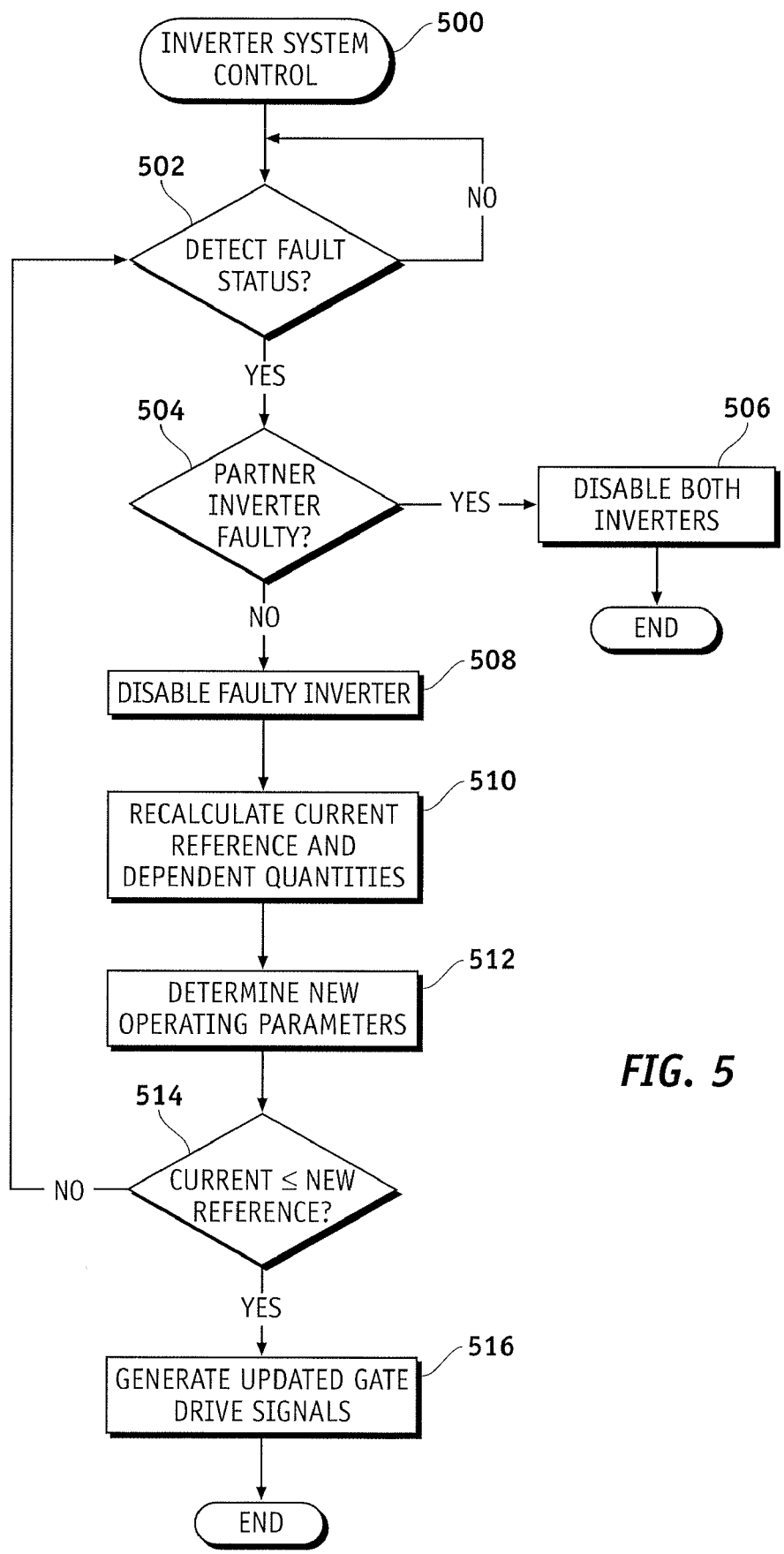
FIG. 5 is a flow chart of an inverter system control process for a multiple DC-to-AC inverter system configured in accordance with an example embodiment of the invention.

FIG. 5 is a flow chart of an inverter system control process 500 for a multiple DC-to-AC inverter system configured in accordance with an example embodiment of the invention. The various tasks performed in connection with process 500 may be performed by software, hardware, firmware, or any combination thereof. For illustrative purposes, the following description of process 500 may refer to elements mentioned above in connection with FIGS. 1-4. In practical embodiments, portions of process 500 may be performed by different elements of the described system, e.g., the controller. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Inverter system control process 500 begins with the detection of a fault status for a faulty inverter among the plurality of inverters in the system (query task 502). Upon the detection of a fault, process 500 may test for the existence of a fault in the partner inverter i.e., the inverter coupled to and cooperating with the faulty inverter. If query task 504 determines that the partner inverter is also faulty, then both of the inverters will be disabled (task 506). If the partner inverter is not faulty, then process 500 can disable the faulty inverter if necessary (task 508). In practice, process 500 may temporarily disable the healthy partner inverter for a short period while process 500 is completed.

Process 500 can then proceed to recalculate the current references for reduced overall performance with the faulty inverter disabled and the healthy inverter enabled (task 510). During task 510, the controller may also recalculate electrical quantities that are dependent upon the current references, for example, the voltage feed-forward terms for the motor control algorithm. Generally, process 500 determines new operating parameters for the healthy inverter (task 512), including a calculation of updated load current requirements that account for the disabling of the faulty inverter.

Once the new operating parameters have been determined, process 500 can check if the current through the winding of the motor affected by the disabling of the faulty inverter has decreased to an acceptable level for single-inverter operation. In this regard, a query task 514 checks whether the motor current is less than or equal to the new current reference value. If not, then process 500 may be re-entered at query task 502 to re-calculate the operating parameters. If so, then process 500 causes the controller to generate updated gate drive signals for the non-faulty inverter and enable the non-faulty inverter to resume operation. Notably, the updated gate drive signal set will be influenced by the new operating parameters such that the non-faulty inverter is not driven to an over-current condition.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a multiple DC-to-AC inverter system of a vehicle having a plurality of inverters, the method comprising:
    generating a fault status for a faulty inverter among the plurality of inverters if the faulty inverter fails or suffers from degraded performance;
    detecting the fault status for the faulty inverter;
    disabling the faulty inverter in response to detection of the fault status to prevent loss of drive power in the vehicle;
    determining new operating parameters for a healthy inverter among the plurality of inverters; and
    generating an updated gate drive signal set for the healthy inverter, the updated gate drive signal set being influenced by the new operating parameters.

2. The method according to claim 1, wherein the determining step further comprises:
    recalculating a current reference for reduced overall performance with the faulty inverter disabled and the healthy inverter enabled;
    recalculating electrical quantities that depend upon the current reference; and
    calculating updated load current requirements that account for the disabling of the faulty inverter.

3. The method according to claim 2, wherein the electrical quantities comprise voltage feed-forward terms of an electric motor control algorithm for the vehicle.

4. The method according to claim 1, wherein the updated gate drive signal set operates to disable the faulty inverter.

5. A method for controlling a multiple DC-to-AC inverter system having a plurality of inverters, the method comprising:
    generating a fault status if a faulty inverter among the plurality of inverters fails or suffers from degraded performance;
    detecting the fault status for the faulty inverter;
    disabling the faulty inverter in response to detection of the fault status to prevent an over-current condition in a healthy inverter;
    recalculating a current reference for reduced overall performance with the faulty inverter disabled and the healthy inverter enabled;
    recalculating electrical quantities that depend upon the current reference;
    calculating updated load current requirements that account for the disabling of the faulty inverter; and
    generating an updated gate drive signal set for the healthy inverter, the updated gate drive signal set being influenced by the current reference, the electrical quantities, and the updated load current requirements.

6. The method according to claim 5, wherein the electrical quantities comprise voltage feed-forward terms of an electric motor control algorithm for the vehicle.

7. The method according to claim 5, wherein the updated gate drive signal set operates to disable the faulty inverter.

8. A system for controlling a multiple DC-to-AC inverter system of a vehicle having a plurality of inverters, the system comprising:
    means for generating a fault status if an inverter fails or suffers from degraded performance;
    means for detecting the fault status for a faulty inverter among a plurality of inverters;
    means for disabling the faulty inverter in response to detection of the fault status to prevent loss of drive power in a vehicle;
    means for determining new operating parameters for a non-faulty inverter among the plurality of inverters; and
    means for generating an updated gate drive signal set for the non-faulty inverter, the updated gate drive signal set being influenced by the new operating parameters.

9. The system according to claim 8, wherein the means for determining the new operating parameters further comprises means for recalculating a current reference for reduced overall performance with the faulty inverter disabled and the non-faulty inverter enabled.

10. The system according to claim 9, wherein the means for determining the new operating parameters further comprises means for recalculating electrical quantities that depend upon the current reference.

11. The system according to claim 10, wherein the electrical quantities comprise voltage feed-forward terms of an electric motor control algorithm for the vehicle.

12. The system according to claim 8, wherein the means for determining the new operating parameters further comprises means for calculating updated load current requirements that account for disabling of the faulty inverter.

13. The system according to claim 8, wherein the updated gate drive signal set operates to disable the faulty inverter.

* * * * *